Patented Oct. 18, 1938

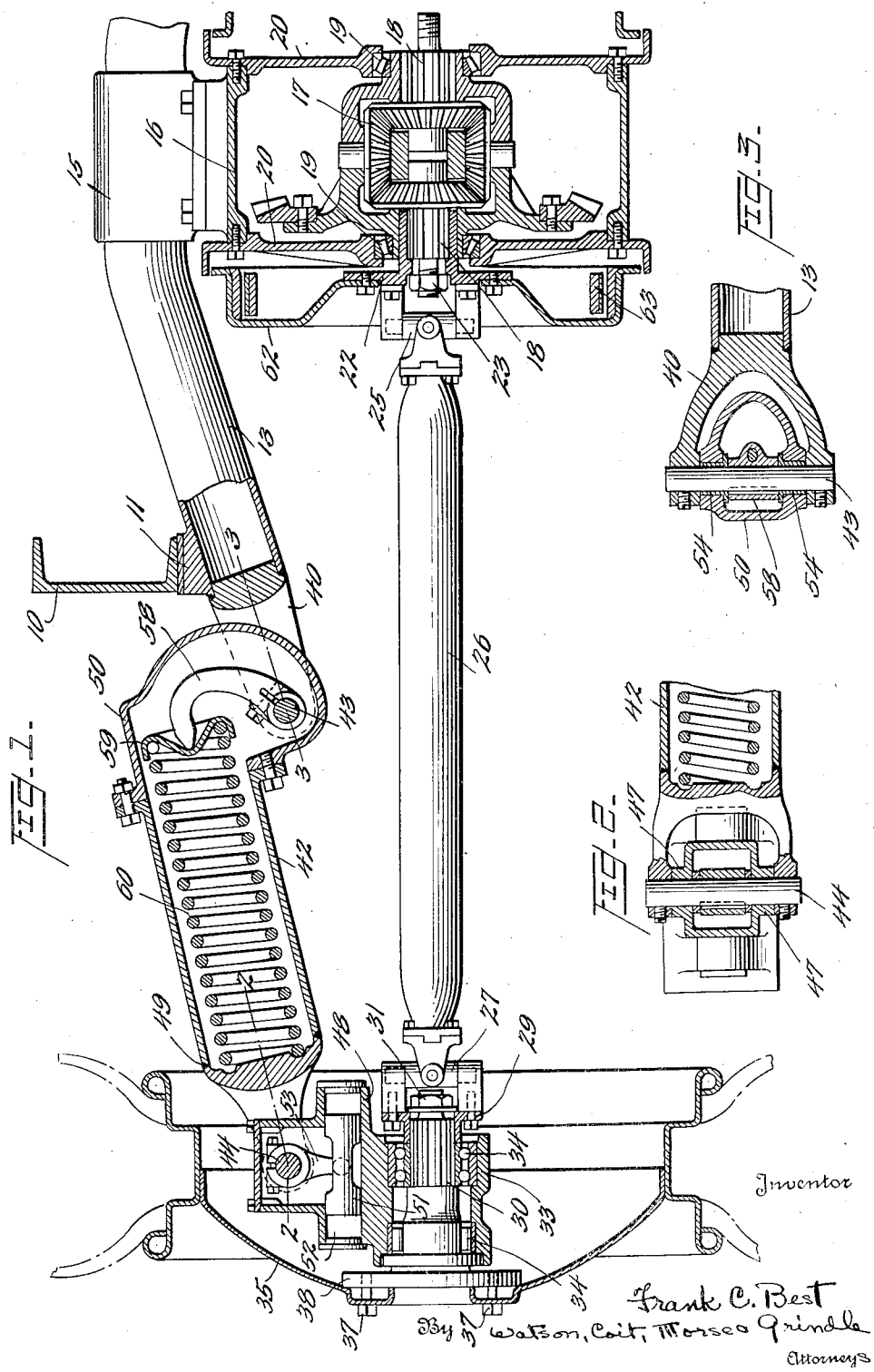

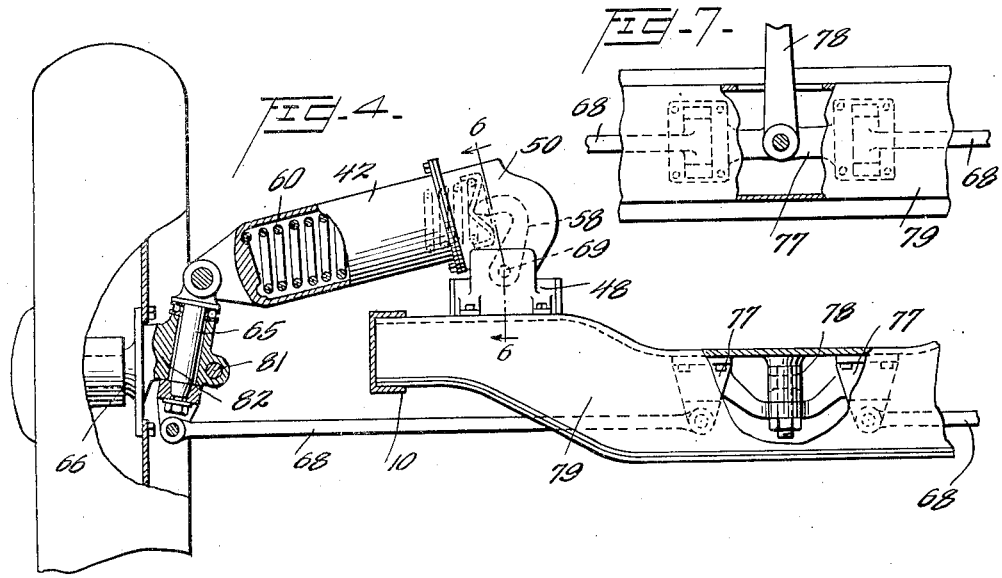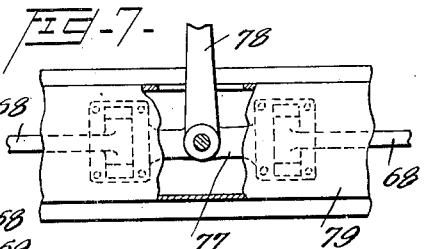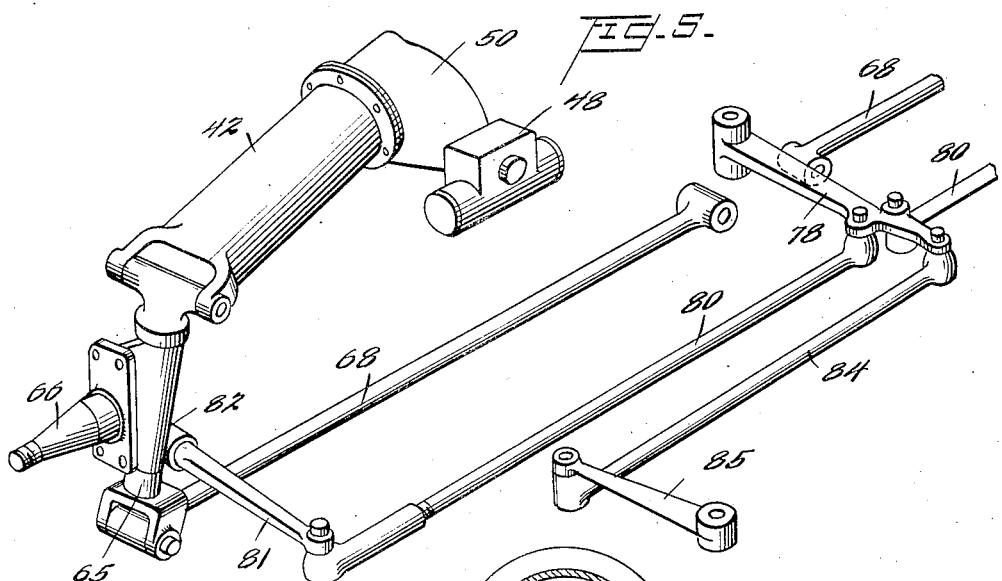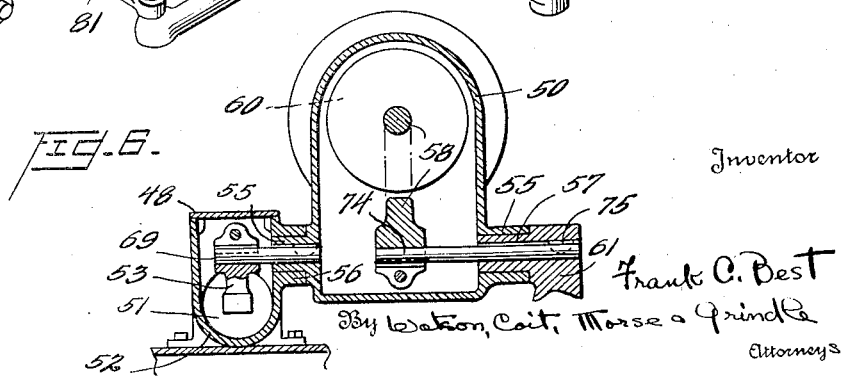

2,133,652

UNITED STATES PATENT OFFICE 2,133,652

MOTOR VEHICLE

Frank C. Best, Detroit, Mich., assignor to Packard Motor Car Company, Detroit, Mich., a corporation of Michigan Application April 18, 1935, Serial No. 17,124

16 Claims. (Cl. 180—43)

This invention relates to motor vehicles and is more particularly concerned with wheel suspensions of the independent type, and with driving mechanism for vehicle road wheels suitable for use with such wheel suspensions.

It is the principal object of the invention to provide a wheel suspension which is simple and inexpensive to construct and which will afford improved riding qualities and freedom from vibrational disturbances, and which is further characterized by minimum of weight with maximum resistance to the stresses to which a vehicle suspension is subjected during operation of the vehicle. While the invention is particularly useful when applied to the suspension of the driving road wheels of the vehicle, ordinarily the rear wheels, certain features of the suspension are readily applied to road wheels which are not employed for the propulsion of the vehicle and which may be used for steering purposes.

It is one of the purposes of the invention to provide a wheel suspension in which coil springs are employed and in which the springs may be housed within one of the working parts of the suspension for protection against injury without the increase of weight which would be involved by the employment of separate spring housing means.

More specifically it is an object of the invention to provide a wheel suspension of the parallel link type, the springs which resist rising movement of the road wheels with respect to the vehicle being housed within one of the links, this link being of tubular construction whereby increased rigidity and resistance to torsional stress is obtained. In the application of the invention to the suspension of the driving wheels for the vehicle, the link in which the suspension spring is housed is preferably the upper of two links of which the lower is constituted by the driving shaft for the road wheels, the unsprung weight being thereby materially reduced.

It is a further feature of the invention as applied to the suspension of the driving road wheels that the transverse driving shafts for the wheels are connected through universal joints to the wheels and to gearing within the differential housing in such manner as to prevent relative lateral displacement of the wheels and the housing, the usual road wheel brake being associated with the differential gearing rather than the wheel in order to simplify the construction and further reduce the unsprung weight.

It is a further object of the invention to provide a wheel suspension of the type indicated in which scuffing of the tires is substantially eliminated and with which steering mechanism affording approximately perfect steering geometry can be employed.

Further objects and features of the invention will be apparent from the following description taken in connection with the accompanying drawings, in which Figure 1 is a partial transverse sectional view illustrating one form of the invention and showing the application thereof to the driving road wheels of the vehicle;

Figure 2 is a sectional view on the line 2—2 of Figure 1;

Figure 3 is a sectional view taken substantially on the line 3—3 of Figure 1;

Figure 4 is a transverse sectional view corresponding to Figure 1 but illustrating a modified form of the invention as applied to a steerable non-driving road wheel;

Figure 5 is a perspective view of the form of the invention shown in Figure 4;

Figure 6 is a section on the line 6—6 of Figure 4; and

Figure 7 is a plan view, partly broken away, of a portion of the structure shown in Figure 4.

Referring first to Figures 1 to 3 inclusive, in which the invention is disclosed in its application to the driving road wheels, one side only of the vehicle being illustrated to avoid unnecessary duplication, it will be observed that one of the usual side frame members 10 is shown, these members forming part of the conventional vehicle frame, the details of which form no essential part of the present invention. Each of the members 10 may be secured by means of a bracket 11 to a transverse member 13 which is preferably tubular in cross-section and which may be carried in a bracket 15 which is bolted or otherwise secured to the upper side of the differential housing 16.

Within the differential housing is supported the usual differential gearing indicated generally at 17, the latter serving to drive the two laterally extending stub shafts 18 which are suitably journalled by means of bearings 19 in the end walls 20 of the housing. Members 22 driven by and splined or otherwise secured rigidly to the stub shafts 18 and secured against axial displacement with respect to the latter by nuts 23, each serves to drive one member of a universal joint 25, these joints being bolted or otherwise secured rigidly to the members 22. Each joint 25 is in turn secured to a transversely extending drive shaft 26, and a similar joint 27 is operatively connected to the outer end of each shaft 26, one element of the joint being secured to the shaft and the other element being secured to a member 29 which is provided with a sleeved portion having a splined connection with the associated wheel spindle 30, being retained on the spindle and against axial displacement with respect thereto by a nut 31.

The construction of each of the road wheels is conventional with the exception of the wheel bearing housing, the details of which are preferably modified as hereinafter described. Thus each wheel spindle 30 is journalled for rotation within the wheel bearing housing 33 by bearings 34, the usual road wheel 35 being secured detachably to the spindle by means of bolts 37 passing through the disk portion of the wheel and threaded in an annular flange 38 formed on the wheel spindle.

It will be observed from the construction thus far described that the shafts 26 may function as links, each of these shafts being so connected to the vehicle frame through the differential gearing and housing and to the wheel assembly as to prevent bodily lateral relative displacement of the wheel and frame, while permitting each of the shafts 26 to swing in a generally vertical plane about a substantially fixed, generally horizontal axis defined by the associated universal joint connection 25. Thus each wheel may rise and fall without disturbing the rotative driving connection between the differential gearing and the wheel.

Each outer end of the transverse member 13 is preferably formed to provide a yoke portion 40 on which a wheel supporting link 42 is pivoted for swinging movement about a generally horizontal axis. As illustrated in the drawings, the link 42 is preferably tubular or hollow throughout the major portion of its length and is formed at its opposite ends to receive spindles 43 and 44 which afford pivotal connections between the link and the frame and wheel assembly respectively. The spindle 44 is keyed or otherwise secured to the link for rotative movement therewith and is journalled by means of bearings 47 in a housing 48 which may be formed integrally with the associated wheel bearing housing 33, the detailed construction of the latter being modified to this extent. For convenience the central tubular portion of each link 42 may be separately formed and welded as indicated at 49 to the outer end portion of the link so as to provide a rigid structure, the inner end portion of the link being preferably constructed to provide a housing 50 which may be bolted to the central tubular portion of the link.

It will be observed that the outer ends of the spindle 43 are secured rigidly in the yoke portion 40 of the member 13, the associated link 42 being journalled on this spindle by bearings 54. Within the housing 50 afforded by the inner portion of each link 42 is disposed an arm 58 which is secured rigidly to the spindle 43 and which extends upwardly therefrom, engaging at its upper end with a spring seat 59, this spring seat affording an abutment for one end of a coil spring 60, the opposite end of the spring reacting against the outer closed end of the link 42. Thus as either road wheel rises with respect to the frame, the associated spring 60 will be compressed to resist such movement, these springs affording the principal resilient support for the vehicle frame. If desired several such springs may be employed, telescoped one within another, only one spring being illustrated in each link 42 to simplify the disclosure.

A conventional shock absorber including a double acting piston 51 is supported for reciprocation in cylinders 52 which are formed in the housing 48, the piston being reciprocated by an arm 53 which is secured to and depends from the spindle 44. Thus as each link 42 and the associated spindle 44 are rotated within the supporting spindle bearings 47, the piston 51 will be reciprocated to cause fluid to flow from one of the cylinders 52 to the other through suitably throttled passages, thereby resisting in the conventional manner any rocking movement of the link 42, and particularly rapid accelerative movements thereof. The details of this shock absorber form no part of the present invention and may be modified as desired. It will nevertheless be understood that the term "shock absorber" is used herein in its ordinary sense to describe mechanism capable of strongly resisting rapid relative accelerative movement of the road wheels and frame and offering much less resistance to gradual or slow relative displacement thereof.

The effective length of the link 42 as shown is substantially less than that of the shaft 26; the relative lengths of the link and shaft are preferably such as to substantially eliminate lateral displacement of the wheel tread as the wheel rises and falls. In other words, the difference in the length of the link 42 and the shaft 26 is sufficient to tilt the plane of the wheel about the horizontal axis defined by the universal joint 27 as the wheel rises, the upper part of the wheel moving inwardly, whereby the tread, or that portion of the wheel which contacts with the ground, partakes of substantially vertical movement. By this arrangement scuffing of the tires and the resulting undesirably rapid wear is effectively prevented.

As shown in the drawings, the axes of the links 42 are all parallel, being substantially horizontal and substantially parallel with the longitudinal center line of the vehicle. It will nevertheless be appreciated that the axes of these links may be inclined, either in a horizontal plane so as to form acute angles with the longitudinal vertical plane containing the center line of the vehicle, or in a vertical plane, or may be inclined in both vertical and horizontal planes. Furthermore, while the links 42 are in effect parallel to the shafts 26, the axes of the links being disposed in a common horizontal plane, this arrangement need not necessarily be followed, and the axes of pivotal connection of the inner ends of the links to the frame may be disposed either above or below the axes of pivotal connection of the outer ends of the links to the associated wheel assemblies. Again, while the links are shown as lying in substantially the same vertical plane, this is not essential, and the links may extend in different directions without interfering with the mode of operation resulting from a generally vertically spaced relationship.

By reason of the location of the springs 60 within the links, the springs are protected against injury by flying rocks or the like, and are screened from water, mud, and other foreign elements. Thus there is less danger of rust and no possibility of the freezing of the springs into a solid mass in inclement weather at low temperatures. At the same time no unnecessary weight is added, and the links 42, which resist practically all the stresses in the suspension, including the driving and braking torque and longitudinal thrust, are made much stronger per unit of weight by reason of their tubular shape. Both the frame and the wheel suspension are further strengthened by the tubular construction of the transverse member 13.

As hereinbefore indicated, it is preferred that braking action be applied adjacent the differential housing in order to simplify the construction and for this purpose a brake drum 62 may be rigidly secured to each of the members 22 at either side of the differential housing 16, suitable brake elements 63, supported by the end walls 20 of the differential housing 16 and cooperating with the drum 62, being actuated by conventional brake operating mechanism which is not shown in detail.

Referring now to the form of the invention illustrated in Figures 4 to 7 of the drawings in which the application thereof to a steerable non-driving road wheel is shown, it will be observed that the construction is generally quite similar to that illustrated in Figures 1 to 3, and the same reference numerals are employed to indicate parts which are similar in construction and function. Thus the link 42 is pivotally connected at its inner end to the vehicle frame and at its outer end to a wheel carrying member 65 on which the wheel spindle 66 is journalled for rotative steering movement in the conventional manner. The lower link comprising the driving shaft 26 of Figures 1 to 3 inclusive is replaced by a rigid link 68 which is pivotally connected at its opposite ends to the member 65 and the frame.

In this form of the invention the shock absorber housing 48 is disposed adjacent to and operatively connected with the inner end of the link 42. Thus as shown more particularly in Figure 6 of the drawings, the housing 50 which constitutes the inner portion of the link 42 is secured rigidly to the shaft 69 of the shock absorber housing, shaft 69 carrying the usual shock absorber arm 53 which is operatively connected to the double acting piston 51, the latter cooperating with the cylinders 52 in the conventional manner to resist accelerative movement of the link 42. The link 42 is journalled for swinging movement in a substantially vertical plane by means of laterally extending bosses 55 which are journalled respectively within a laterally extending boss 56 on the shock absorber housing and upon a boss 57 formed on a bracket 61 which is secured in any convenient manner to the vehicle frame.

The arm 58 which affords an abutment for one end of the spring 60 is rigidly secured to a shaft 74, the latter being in turn keyed or otherwise secured to the bracket 61 as indicated at 75, so that the arm 58 is positively retained against rotative movement.

The lower link 68 is pivoted at its inner end to a bracket 77 carried by the usual cross frame member 79, this bracket affording a fulcrum for both of the laterally extending links and also serving to pivotally support a central steering arm 78, the latter being pivoted for swinging movement in a generally horizontal plane. Oppositely directed steering links 80 are pivotally connected by ball joints or the like to the arm 78 and to arms 81 which are secured to the spindle carrying member 82, the latter partaking of rotative steering movement with the vehicle wheel. It will be observed that each steering link 80 is disposed substantially in the plane of the associated wheel supporting link 68 and is of substantially the same effective length. Thus on rising and falling movement of either steering wheel, the associated steering link 80 is permitted to swing about its point of pivotal connection with the central steering arm 78 without disturbing the steering position of the road wheel. The arm 78 may be pivotally connected in turn with a link 84 which is provided with an articulated connection with an arm 85 which may be secured to the lower end of a steering column in the conventional manner.

It is obvious that in this form of the invention the links 68 and 42 may be reversed in position, it being immaterial which of these links is disposed above the other. Various other changes in the details of the construction described are contemplated such as would occur to one skilled in the art to which the invention relates, and various alterations and modifications may be effected without departing from the spirit of the invention as defined in the appended claims.

Having thus described the invention, what is claimed as new and desired to be secured by Letters Patent is:

1. In a wheel suspension for motor vehicles, the combination with a vehicle frame, of oppositely disposed road wheels, and means supporting said wheels on said frame for independent rising and falling movement with respect thereto, said means comprising a laterally extending, rotatble drive shaft associated with each wheel, each shaft being supported on said frame against lateral displacement with respect thereto and for swinging movement about a substantially fixed, generally horizontal axis, a driving connection between each wheel and the associated drive shaft preventing relative lateral displacement of said wheel and shaft, said connection including a universal joint, and a link having pivotal connection with each wheel and frame.

2. In a wheel suspension for motor vehicles, the combination with a vehicle frame, of oppositely disposed road wheels, and means supporting said wheels on said frame for independent rising and falling movement with respect thereto, said means comprising a laterally extending, rotatable drive shaft associated with each wheel, each shaft being supported on said frame against lateral displacement with respect thereto and for swinging movement about a substantially fixed, generally horizontal axis, a driving connection between each wheel and the associated drive shaft preventing relative lateral displacement of said wheel and shaft, said connection including a universal joint, and a link having pivotal connection with each wheel and frame about axes substantially parallel to the fixed supporting axis for the associated shaft.

3. In a wheel suspension for motor vehicles, the combination with a vehicle frame, of oppositely disposed road wheels, and means supporting said wheels on said frame for independent rising and falling movement with respect thereto, said means comprising a laterally extending, rotatable drive shaft associated with each wheel, each shaft being supported on said frame against lateral displacement with respect thereto and for swinging movement about a substantially fixed, generally horizontal axis, a driving connection between each wheel and the associated drive shaft preventing relative lateral displacement of said wheel and shaft, said connection including a universal joint, and a link having pivotal connection with each wheel and frame about axes substantially parallel to the fixed supporting axis for the associated shaft, each link being of substantially less effective length than the associated shaft, the relative lengths of said links and shafts being such that lateral displacement of the wheel tread as either wheel rises and falls is substantially eliminated.

4. In a wheel suspension for motor vehicles, the combination with a vehicle frame, of oppositely disposed driving road wheels, and means supporting said wheels on said frame for independent rising and falling movement with respect thereto, said means comprising a differential housing carried by said frame and supporting differential gearing therein, a laterally extending, rotatable drive shaft associated with each wheel, means including a universal joint for operatively connecting each shaft to said gearing and maintaining the shaft and frame against relative bodily lateral displacement, means including a universal joint for operatively connecting each shaft to the associated wheel and maintaining the shaft and wheel against relative bodily lateral displacement, and a link having pivotal connection with each wheel and the frame about substantially horizontal parallel axes, the link and shaft associated with each wheel being disposed in vertically spaced relation.

5. In a wheel suspension for motor vehicles, the combination with a vehicle frame, of oppositely disposed driving road wheels, and means supporting said wheels on said frame for independent rising and falling movement with respect thereto, said means comprising a differential housing carried by said frame and supporting differential gearing therein, a laterally extending, rotatable drive shaft associated with each wheel, means including a universal joint for operatively connecting each shaft to said gearing and maintaining the shaft and frame against relative bodily lateral displacement, means including a universal joint for operatively connecting each shaft to the associated wheel and maintaining the shaft and wheel against relative bodily lateral displacement, a link having pivotal connection with each wheel and the frame about substantially horizontal parallel axes, each link being of generally tubular construction, the link and shaft associated with each wheel being disposed in vertically spaced relation, and spring means disposed within each link for resisting rising movement of the associated wheel.

6. In a wheel suspension for motor vehicles, the combination with a vehicle frame, of oppositely disposed driving road wheels, and means supporting said wheels on said frame for independent rising and falling movement with respect thereto, said means comprising a differential housing carried by said frame and supporting differential gearing therein, a laterally extending, rotatable drive shaft associated with each wheel, means including a universal joint for operatively connecting each shaft to said gearing and maintaining the shaft and frame against relative bodily lateral displacement, means including a universal joint for operatively connecting each shaft to the associated wheel and maintaining the shaft and wheel against relative bodily lateral displacement, a link having pivotal connection with each wheel and the frame about substantially horizontal parallel axes, each link being of generally tubular construction, the link and shaft associated with each wheel being disposed in vertically spaced relation, coil spring means disposed within each link and reacting at one end against the link, and a fixed abutment engaging the opposite end of said coil spring means at a point spaced from the axis of pivotal connection of the link to the frame.

7. In a wheel suspension for motor vehicles, the combination with a vehicle frame, of oppositely disposed driving road wheels, and means supporting said wheels on said frame for independent rising and falling movement with respect thereto, said means comprising a differential housing carried by said frame and supporting differential gearing therein, a laterally extending, rotatable drive shaft associated with each wheel, means including a universal joint for operatively connecting each shaft to said gearing and maintaining the shaft and frame against relative bodily lateral displacement, means including a universal joint for operatively connecting each shaft to the associated wheel and maintaining the shaft and wheel against relative bodily lateral displacement, and a link having pivotal connection with each wheel and the frame about substantially horizontal parallel axes, said frame including a tubular transversely extending member secured to said differential housing and affording a fulcrum for said links, the link and shaft associated with each wheel being disposed in vertically spaced relation.

8. In a wheel suspension for motor vehicles, the combination with a vehicle frame, of oppositely disposed road wheels, and means supporting each of said wheels on said frame for rising and falling movement independently of the other wheel, said means comprising a pair of laterally extending, generally vertically spaced links having pivotal connection with said frame and wheel, at least one of said links being of generally tubular construction, and coil spring means extending within said last named link and acting between said frame and said last named link to resist rising movement of the latter.

9. In a wheel suspension for motor vehicles, the combination with a vehicle frame, of oppositely disposed road wheels, and means supporting each of said wheels on said frame for rising and falling movement independently of the other wheel, said means comprising a pair of laterally extending, generally vertically spaced links having pivotal connection with said frame and wheel, at least one of said links being of generally tubular construction, coil spring means disposed within said last named link, and an abutment for said coil spring means supported rigidly by said frame and extending within said last named link.

10. In a wheel suspension for motor vehicles, the combination with a vehicle frame, of oppositely disposed road wheels, and means supporting each of said wheels on said frame for rising and falling movement independently of the other wheel, said means comprising a pair of laterally extending generally vertically spaced links having pivotal connection with said frame and wheel, at least one of said links being of generally tubular construction, coil spring means disposed within said last named link, a shaft secured rigidly to said frame and affording a fulcrum on which said last named link may be journalled, an abutment rigidly secured to said shaft and extending within said link for engagement with said spring means, and an opposing abutment carried by and within said link for engagement with said spring means.

11. In a wheel suspension for motor vehicles, the combination with a hollow wheel supporting link of fixed effective length, of resilient means for yieldably urging said link in one direction, said means including a coil spring disposed within and having the axis thereof extending generally lengthwise of said link.

12. In a wheel suspension for motor vehicles, the combination with a vehicle frame, of oppositely disposed road wheels, and means supporting each of said wheels on said frame for rising and falling movement independently of the other wheel, said means comprising a wheel carrying member on which said wheel is supported for steering movement, a pair of laterally extending, generally vertically spaced links pivotally connected to said member and frame for swinging movement about substantially parallel axes, one of said links being of materially greater length than the other, at least one of said links being of generally tubular construction, coil spring means extending within said last named link and acting between said frame and said last named link to resist rising movement of the latter, and steering mechanism operatively connected to said wheel to impart steering movement thereto, said mechanism including a steering link having substantially the same effective length as one of said links and being disposed substantially in the plane thereof.

13. In a wheel suspension for motor vehicles, the combination with a vehicle frame, of a road wheel, wheel supporting means including a link having pivotal connection with said frame and wheel, and a shock absorber carried by said wheel, said shock absorber having an actuating shaft affording a fulcrum for said link.

14. In a motor vehicle, the combination with a road wheel assembly including a wheel carrying member and a road wheel journalled thereon, of a shock absorber supported by said wheel carrying member, a wheel supporting link having pivotal connection with said wheel carrying member, and means for actuating said shock absorber in response to relative movement of said member and link.

15. In a wheel suspension for motor vehicles, the combination with a vehicle frame, of oppositely disposed driving road wheels, and means supporting said wheels on said frame for independent rising and falling movement with respect thereto, said means comprising a differential housing carried by said frame and supporting differential gearing therein, a laterally extending, rotatable drive shaft associated with each wheel, means including a universal joint for operatively connecting each shaft to said gearing and maintaining the shaft and frame against relative bodily lateral displacement, means including a universal joint for operatively connecting each shaft to the associated wheel and maintaining the shaft and wheel against relative bodily lateral displacement, a link having pivotal connection with each wheel and the frame about substantially horizontal parallel axes, the link and shaft associated with each wheel being disposed in vertically spaced relation, and vehicle brake means associated with said differential housing and transmitting braking effort to said wheels through said shafts.

16. In a wheel suspension for motor vehicles, the combination with a vehicle frame, of oppositely disposed driving road wheels, and means supporting said wheels on said frame for independent rising and falling movement with respect thereto, said means comprising a differential housing carried by said frame and supporting differential gearing therein, a laterally extending, rotatable drive shaft associated with each wheel, means including a universal joint for operatively connecting each shaft to said gearing and maintaining the shaft and frame against relative bodily lateral displacement, means including a universal joint for operatively connecting each shaft to the associated wheel and maintaining the shaft and wheel against relative bodily lateral displacement, a link having pivotal connection with each wheel and the frame about substantially horizontal parallel axes, the link and shaft associated with each wheel being disposed in vertically spaced relation, and vehicle brake means associated with said differential housing and transmitting braking effort to said wheels through said shafts, said brake means including braking elements acting between said gearing and the adjacent universal joint connections.

FRANK C. BEST.